(12) United States Patent
Boillot et al.

(10) Patent No.: US 8,060,841 B2
(45) Date of Patent: Nov. 15, 2011

(54) METHOD AND DEVICE FOR TOUCHLESS MEDIA SEARCHING

(75) Inventors: Marc Boillot, Plantation, FL (US); Jason McIntosh, Sugar Hill, GA (US)

(73) Assignee: NaviSense, Plantation, FL (US)

( * ) Notice: Subject to any disclaimer, the term of this patent is extended or adjusted under 35 U.S.C. 154(b) by 811 days.

(21) Appl. No.: 12/050,790

(22) Filed: Mar. 18, 2008

(65) Prior Publication Data

US 2008/0235621 A1 Sep. 25, 2008

Related U.S. Application Data

(60) Provisional application No. 60/895,733, filed on Mar. 19, 2007.

(51) Int. Cl.
*G06F 3/033* (2006.01)
*G09G 5/00* (2006.01)

(52) U.S. Cl. ........ 715/863; 715/810; 715/702; 345/173; 345/156

(58) Field of Classification Search .................. 715/863, 715/810, 702; 345/156–158
See application file for complete search history.

(56) References Cited

U.S. PATENT DOCUMENTS

| | | | |
|---|---|---|---|
| 5,274,363 A | 12/1993 | Koved | |
| 5,454,043 A * | 9/1995 | Freeman | 382/168 |
| 5,481,454 A * | 1/1996 | Inoue et al. | 704/3 |
| 6,072,494 A * | 6/2000 | Nguyen | 715/863 |
| 6,130,663 A | 10/2000 | Null | |
| 6,137,427 A | 10/2000 | Binstead | |
| 6,313,825 B1 | 11/2001 | Gilbert | |
| 6,611,253 B1 * | 8/2003 | Cohen | 345/168 |
| 6,937,227 B2 | 8/2005 | Qamhiyah | |
| 7,038,658 B2 * | 5/2006 | Seki et al. | 345/156 |
| 7,078,911 B2 | 7/2006 | Cehelnik | |
| 7,092,109 B2 | 8/2006 | Satoh | |
| 7,130,754 B2 | 10/2006 | Satoh | |
| 2003/0132913 A1 | 7/2003 | Issinski | |
| 2003/0132950 A1 * | 7/2003 | Surucu et al. | 345/700 |
| 2004/0178995 A1 * | 9/2004 | Sterling | 345/173 |
| 2005/0210020 A1 * | 9/2005 | Gunn et al. | 707/3 |
| 2006/0010400 A1 * | 1/2006 | Dehlin et al. | 715/856 |
| 2006/0092022 A1 | 5/2006 | Cehelnik | |
| 2006/0161870 A1 * | 7/2006 | Hotelling et al. | 715/863 |
| 2006/0161871 A1 * | 7/2006 | Hotelling et al. | 715/863 |
| 2006/0164241 A1 | 7/2006 | Makela | |
| 2006/0224429 A1 | 10/2006 | Mathew | |
| 2006/0256082 A1 * | 11/2006 | Cho et al. | 345/156 |
| 2006/0256090 A1 | 11/2006 | Huppi | |
| 2006/0267951 A1 * | 11/2006 | Rainisto | 345/173 |
| 2007/0103431 A1 * | 5/2007 | Tabatowski-Bush | 345/156 |
| 2007/0127039 A1 | 6/2007 | Njolstad | |
| 2007/0152961 A1 * | 7/2007 | Dunton et al. | 345/156 |
| 2007/0154093 A1 * | 7/2007 | Dunton et al. | 382/186 |
| 2007/0236475 A1 * | 10/2007 | Wherry | 345/173 |
| 2008/0005703 A1 * | 1/2008 | Radivojevic et al. | 715/863 |
| 2009/0106655 A1 * | 4/2009 | Grant et al. | 715/702 |

* cited by examiner

*Primary Examiner* — Tadeese Hailu

(57) ABSTRACT

A method and device for media searching based on touchless finger signs (312) and gestures (313) is provided. The device (100) can include a controller element (110) that receives a search string from a touchless sensing device and presents at least one media (412) that corresponds to at least a portion of the search string. The media can include audio, image, video, and text selections (326). The search string can include at least one alpha-numeric character generated in a touchless sensory field of the touchless sensing device.

20 Claims, 11 Drawing Sheets

TOUCHLESS COLUMN SELECT

TOUCHLESS MEDIA SELECT AND ZOOM

METHOD AND DEVICE FOR TOUCHLESS MEDIA SEARCHING

CROSS-REFERENCE TO RELATED APPLICATION

This application incorporates by reference the following Utility Applications: U.S. patent application Ser. No. 11/683,410 entitled "Method and System for Three-Dimensional Sensing" filed on Mar. 7, 2007 claiming priority on U.S. Provisional Application No. 60/779,868 filed Mar. 8, 2006, and U.S. patent application Ser. No. 11/683,415 entitled "Sensory User Interface" filed on Mar. 7, 2007 claiming priority on U.S. Patent Application No. 60/781,179 filed on Mar. 13, 2006.

FIELD

The present embodiments of the invention generally relate to the field of searching, more particularly to searching media via a user interface.

BACKGROUND

As information becomes more readily available over the Internet and through interconnected devices, people have more information from which to choose. As an example, peer networks are rapidly being deployed that allow mobile device users to share enormous amounts of information. Moreover, users are able to download vast quantities of data on mobile portable devices and home computers. Users generally search the information for specific data that may be of interest to them. A mobile device or computer generally provides a user interface which can display the information. Mobile devices and computer systems generally include a keyboard, mouse, touchpad, or stick for controlling the user interface. However, the user interface is generally small, and with the large increase in displayed information, it can be difficult to search for specific content. Moreover, as mobile devices become even smaller and more information is presented to the mobile device, it becomes more difficult to navigate and search the user interface for data.

A need therefore exists for a user interface and method of user interface searching that enhances information searching productivity.

BRIEF DESCRIPTION OF THE DRAWINGS

The features of the embodiments of the invention, which are believed to be novel, are set forth with particularity in the appended claims. Embodiments of the invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
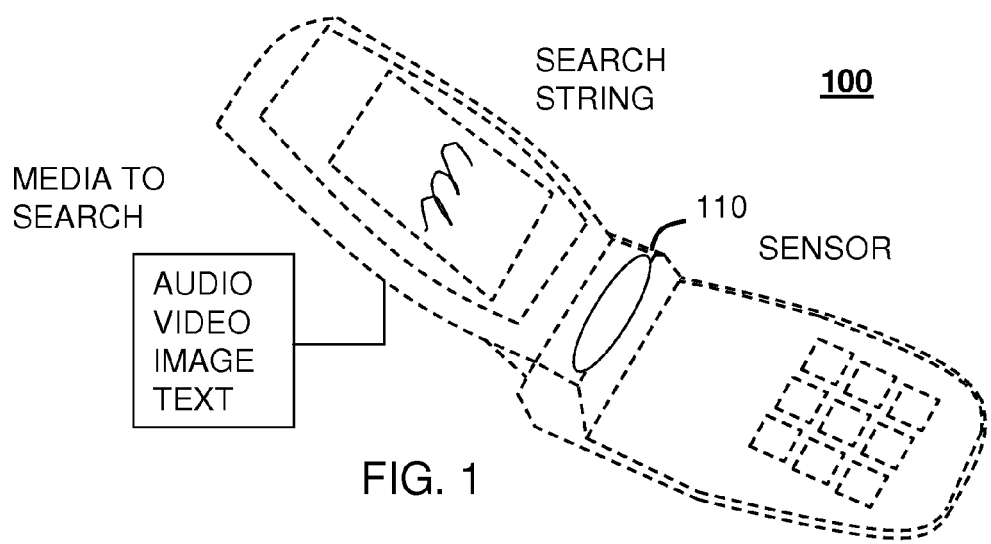
FIG. 1 is an exemplary sensory device that recognizes touchless finger movements in accordance with one embodiment.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system.

Broadly stated, embodiments are directed to a method and apparatus for touchless media searching.

In one embodiment, a computer readable storage medium can have computer instructions for receiving a search string generated from a touchless finger signing of at least one alpha-numeric character or gesture, and presenting a list of media that corresponds to at least a portion of the search string. The media can include audio, image, video, or text data.

In a second embodiment, a media device can have a controller element that receives a search string from a touchless sensing device and presents at least one media that corresponds to at least a portion of the search string. The search string can include at least one alpha-numeric character or gesture generated in a touchless sensory field of the touchless sensing device.

In a third embodiment, a media system can have a controller element that receives a search string having at least one alpha-numeric character or gesture produced from a touchless finger signing, and searches for a media that corresponds to at least a portion of the search string.

In a fourth embodiment, a computer readable storage medium can have computer instructions for presenting a graphical user interface (GUI) that responds to touchless finger signs, receiving a search string corresponding to a touchless finger sign, searching through the GUI for media corresponding to the search string, and presenting a result of the searching.

Referring to FIG. 1, a sensor device 110 is shown. In one arrangement, the sensor device 110 can be used in conjunction with a media device 100. The media device 100 may be a mobile device, a cell phone, a portable music player, a memory storage unit, a security device, a personal digital assistant, a laptop, a notebook computer, a remote control, or any other suitable device providing or exposing a user interface. The sensor device 110 may attach to the media device 100 as an external accessory, or it may be internal to, or integrated with, the media device. The sensor device 110 is not limited to the location shown. The sensor device 110 can attach along side the media device, near a top of the display, near the bottom, or any other location, as example. Briefly, the sensor device 110 can generate a touchless sensing space that allows a user to interact with the media device 100 through touchless actions; including touchless finger movements such as a touchless finger sign or gesture. In one aspect, a finger action may be a finger sign such as an alpha-numeric character, or a finger gesture such as a touchless scroll or touchless selection.

Figure 2:
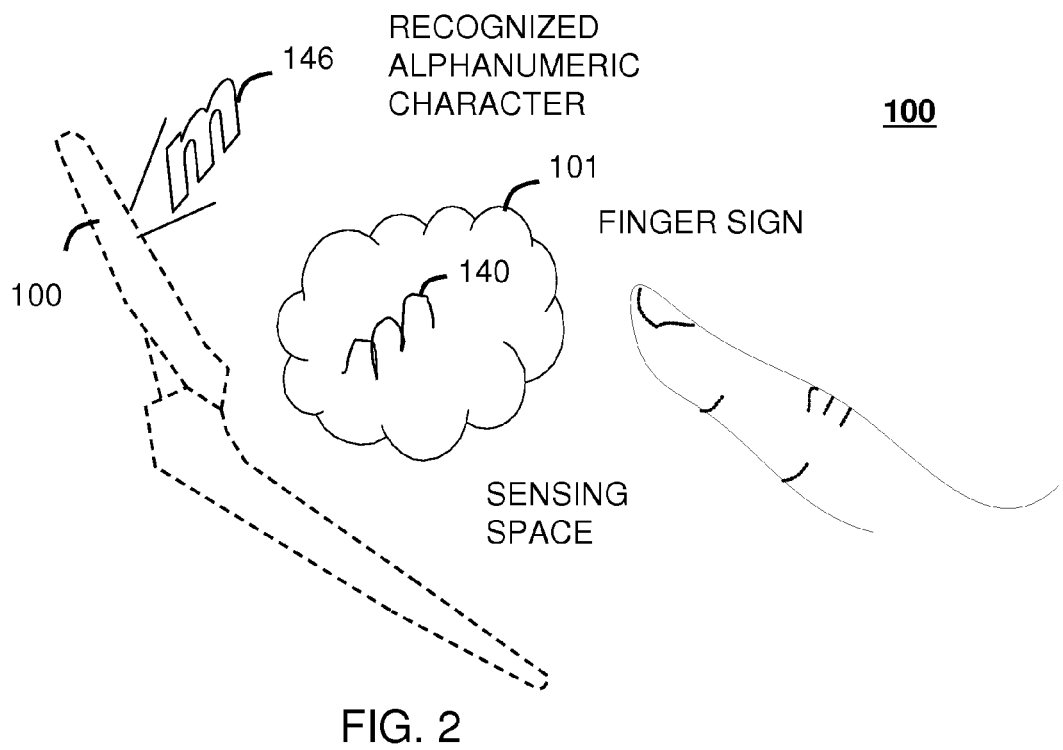
FIG. 2 is an exemplary sensory space for capturing touchless finger signs and gestures in accordance with one embodiment.

As shown in FIG. 2, the sensor device 110 can generate a touchless sensing space 101 wherein a user can interact with the media device 100 via touchless finger signs or gestures. In one arrangement, the user can position a finger within the touchless sensing space 101 to interface with the media device 100, separate from any surface of the media device, display, or keypad. In another arrangement the sensor device 110 can project a sensing space onto the display or panel of the media device 100. The media device 100 can include a non-touch based user display that presents a different user interface for different applications. In this way, the media device-though not configured with a touchscreen—can effectively perform as a touchscreen. The media device 100 can include removable face plates for different applications. The touchless sensing space 101 does not require touch based actions like a keypad, touch screen or a touchpad, although it can support such actions. The sensing space can be 2 cm to 10 cm above a surface of the media device. When projected against a surface, a sensing field can be created on the surface less than 2 cm heigh.

In one aspect, a user can motion a finger sign or a finger gesture for acquiring and handling a control of a user interface on the media device. In another aspect, the sensing device 100 perform touchless character recognition of finger signs in the touchless sensing space 101. For example, a user can move the finger in the touchless sensing space 101, or along a surface of the media device 100, and draw out a character 140. The sensing device 110 can recognize the character from the finger movement, and present a pattern 146 corresponding to the finger sign 140. For example, a user can finger sign the letter 'e' 140 and the sensing unit 110 can present the text pattern 'e' on the display. The sensor device 100 can enter the pattern into an application such as a search engine, notepad application, an email message, a dictation application, a phone number dialing application, a Global Positioning System location, an address book, a picture album, a contact list, or any other application which can process textual information, such as letters, characters, or symbols.

Figure 3:
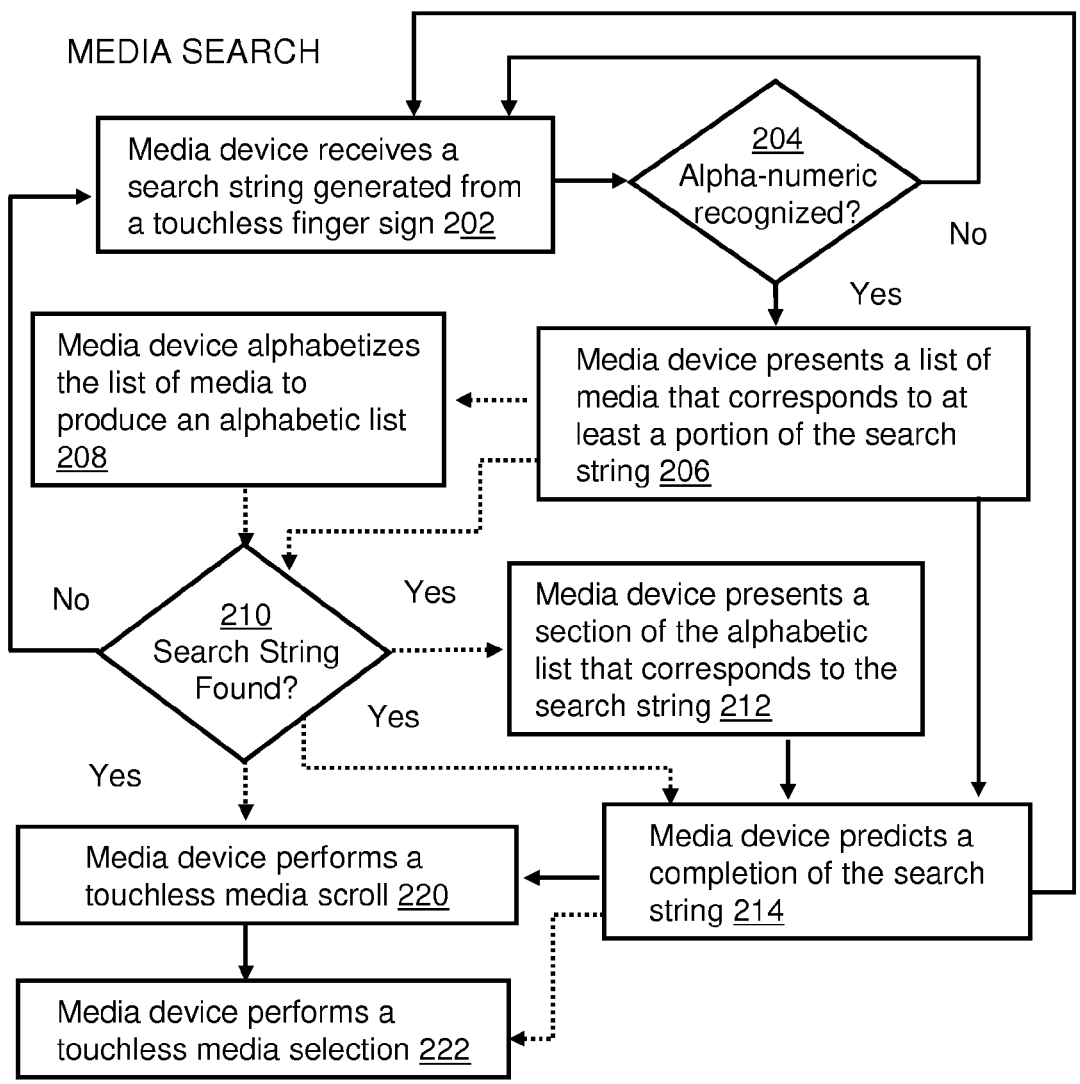
FIG. 3 is an exemplary method for searching media in accordance with one embodiment.

Referring to FIG. 3, an exemplary method 200 for touchless searching is shown. The exemplary method 200 is shown as a flowchart and can include more or less than the number of components shown. Moreover, the method steps do not need to be practiced in the order shown, and can be practiced in any order. Method 200 presents one embodiment of the method steps for touchless searching though other embodiments are herein contemplated and as can be interpreted by the claims. The method can start at step 202 where the media device 100 receives a search string generated from a touchless finger sign. A finger sign may be an alpha-numeric character such as 0-9 and a-z generated in the touchless sensing space 101. The alpha-numeric character may also be a finger gesture such as a symbolic sign for a hot-key shortcut, such as a check, a swipe, a poke, an accelerated movement, or a scroll. The alpha-numeric character may also be a symbol representative of a foreign language syntax thus having a different representation.

Briefly, the media device 100 can present a user interface displaying various media or lists of media. The media may be audio, image, video, or text. For example, the user interface may present a selection of songs, a list of emails, a list of voice mails, a list of addresses, a list of locations, a list of pictures, a list of a list of businesses, or any other list of media. A user can create a finger sign in the touchless sensing space 101 to identify a media. The search string, or any portion of the search string, can identify the media by name or spelling. For instance, the search string may identify a name of an artist, a name of a band, a name of a song, a name of a station, or a genre of music. As an example, the user may write the acronym "CNN" via touchless finger signing, one letter at a time. The search string may be a one or more letters of the spelling of a person such as "John" in a contact list. The search string may be a spelling of a picture title, a location where a picture is taken, the name of people in the picture, or a date of a picture.

At step 204, the media device can determine if the alpha-numeric finger sign is recognized. The media device 101 can include a pattern recognition engine for recognizing the touchless finger sign. Alternatively, the sensing device 110 can include a recognition engine that informs the media device 100 of the recognized character. In practice, the media device 100 can determine when a user completes a character, and then provide an indication if the character has been recognized. For example, the media device 100 can display a text of the recognized alpha-numeric character. The media device can audibly or visually present an acknowledgement of the recognition. The pattern recognition engine can recognize one character at a time as the search string is created. The pattern recognition engine can identify finger signs, alphanumeric characters, and gestures from paused finger signing (start/pause) and continuous motion finger signing.

At step 206, the media device can present a list of media that corresponds to at least a portion of the search string. For example, the media may be a list of contacts identified by name as shown in the user interface 301 of FIG. 3. The user may generate a finger sign for the letter 'm' to commence a media search. As another example, the media device may present a list of pictures arranged by title. A user can generate a search string for the name of the title. If the user cannot remember the title name, but can remember people in the picture, the media device 100 can keep track of the people in each picture. For instance, a database of pictures with the names of people can be stored in a list. When a user desires to locate a picture with certain people, the user can spell out the name of a person in the picture. The media device can then search for pictures that have the name of a person that matches the spelling provided in the search string by the user. In yet another example, the pictures can be arranged by location or date. Similarly, the user can present a search string that identifies a location or date. The media device can present a list of media tagged with location and date metadata. In yet another embodiment, a list of media such as songs can be presented by artist name, genre, style, or band name.

Referring back to FIG. 3, at step 208, the media device can optionally alphabetize the list of media to produce an alphabetic list. For example, the list of contacts in the user interface 301 of FIG. 4 can be arranged alphabetically, a list of songs can be arranged alphabetically, a list of pictures can be arranged alphabetically, a list of businesses can be arranged alphabetically, or any other list can be arranged alphabetically or in another preferred search format.

Referring back to FIG. 3, at step 210, the media device can determine if the search string is found. That is, the media device 100 can determine if a media selection matches at least a portion of the search string. A portion of the search string may be a character, a sub-string, or an entire name of a media. If the search string is found, the media device can present a section of the alphabetic list that corresponds to the search string in step 212. Recall, the search string may also be used to search attributes of a media, such as a name of a person in a picture, a location (e.g. GPS) of where a picture was taken, a time (e.g. day) an email was received, a name of a person affiliated with a business or project, or a name of a media station.

Figure 4:
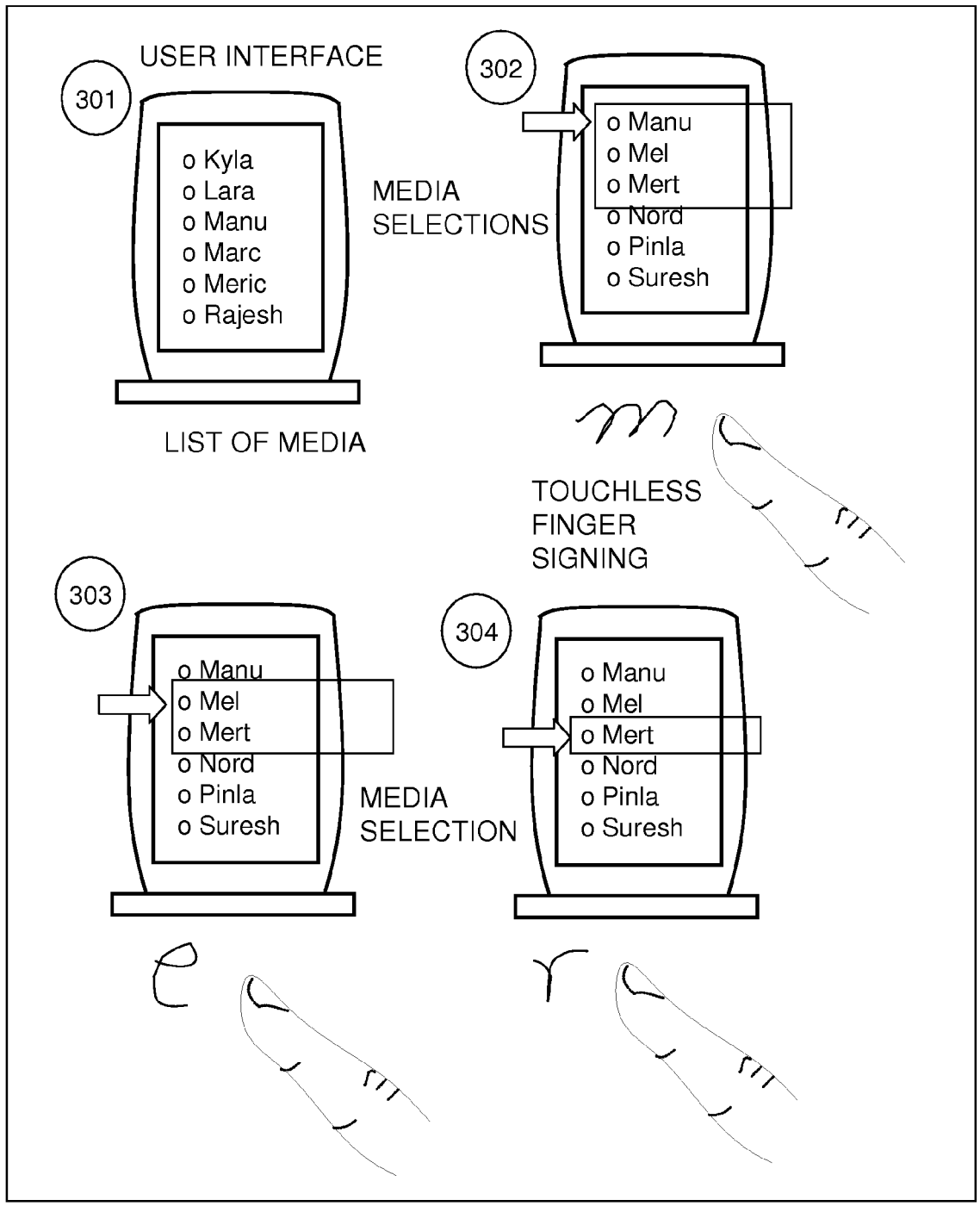
FIG. 4 is an exemplary user interface for searching media using touchless finger signs in accordance with one embodiment.

For example, referring to FIG. 4, at 302, upon signing the letter 'm', the media device can order the list in accordance with the recognized alpha-numeric character 'm'. in such regard, the user interface can start with the first media that is a match to the letter 'm'. As shown, the list of media corresponding to the search string can be presented at the top of the user interface. Arranging the list of media at the top is merely one embodiment, and the list of media can start anywhere in the user interface. The media device may also visually indicate all the media selections that match the search string. For example, the list of all names that start with the letter 'm' may be highlighted, changed in font, adjusted in size (e.g. zoom), graphically altered, or audibly presented.

Referring back to FIG. 2, at step 214, the media device 100 can predict a completion of a search string. In one arrangement, the method 200 can continue back to step 202 to receive a search string, or other alpha-numeric characters associated with a current search string. For example, as shown in step 303 of FIG. 4, the user can continue to create alpha-numeric finger signs to complete the search string. At each step, the media device can predict the media selection in view of the search string. The media device 100 can predict a completion of the search string from a history of media selections, most frequently accessed search strings, or from dictionary entries. Moreover, the media device can update the prediction for each recognized alpha-numeric character received. In one arrangement, as shown in FIG. 4, prediction involves identifying the media selections available that match the search string. As an example for providing predictive feedback to the user, the media device 100 can display an overlay box over the media selection to predict potential media matches, highlight the matching media selections, or provide any other visual or auditory indication. As the user continues to create touchless finger signs for alpha-numeric characters, the media device 100 can narrow the prediction, until ultimately only one selection remains, or until the user acquires touchless control of the user interface. In the former case, as shown in the example of FIG. 4, the media device 100 narrows the selection to the 4 character name "mert" even though the user only created the 3 character name 'mer' since mert is the only match in the list of media, as example.

In the latter case, the user can acquire touchless control when the list of media has been sufficiently narrowed to expedite the search. For example, referring back to FIG. 3, at step 220, the media device 100 can perform a touchless scroll in response to a scroll through the list of media. A touchless scroll, can be a touchless finger sign such as a clockwise circular pattern to scroll down, or a clockwise circular pattern to scroll up, but is not limited to these. At step 222, the media device can perform a touchless selection to select a media in the list of media. A touchless selection can be, as example, an up-down or left-right jitter movement to denote a request by the user to select the media.

Figure 5:
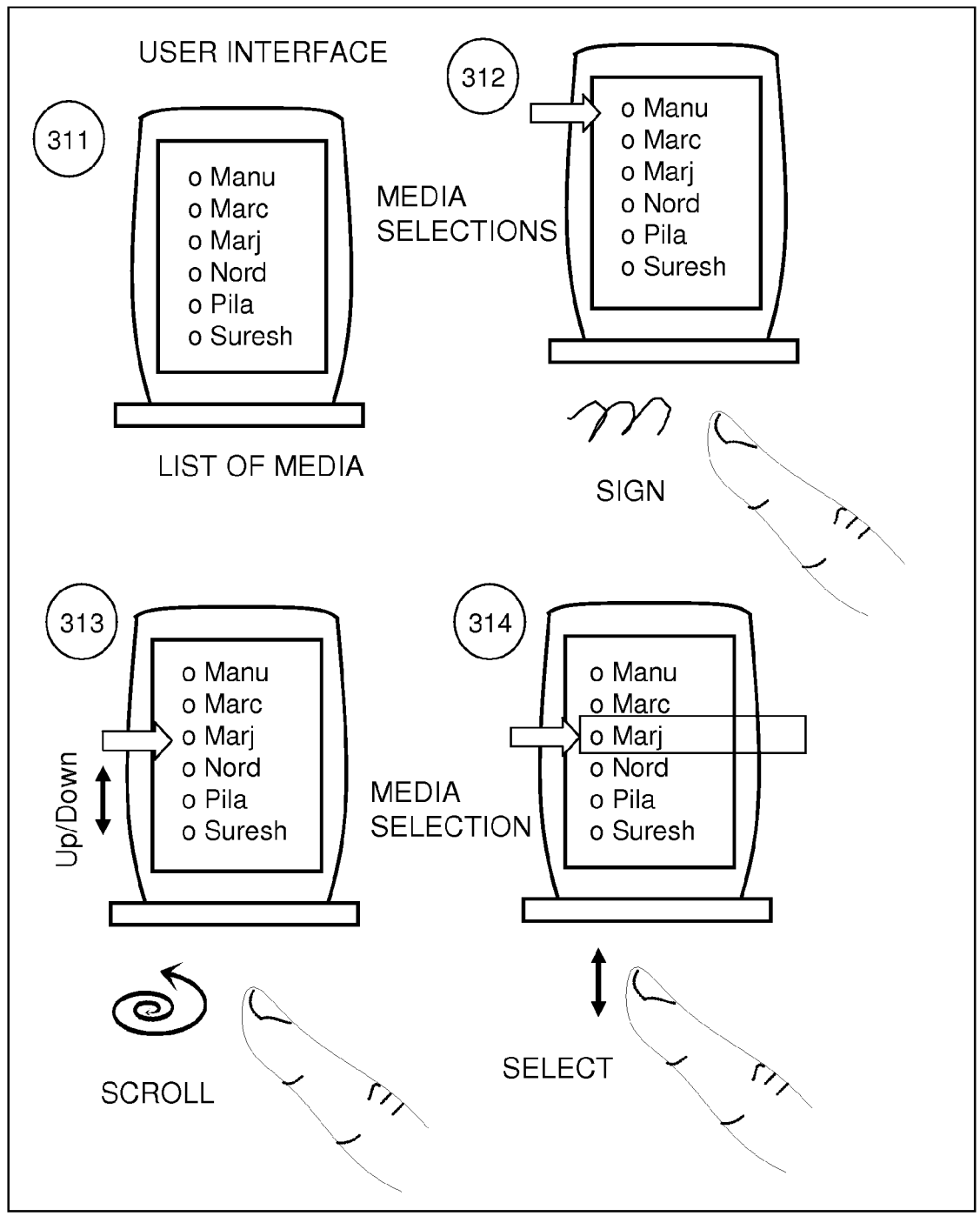
FIG. 5 is an exemplary user interface for searching media using a combination of touchless finger signs and finger gestures in accordance with one embodiment.

Referring to FIG. 5, an exemplary user interface for searching media using a combination of alpha-numeric finger signs and user control finger signs is shown. Again, as example, the list of media may be a list of names as shown. Notably, the list of media may be a list of songs, titles, artists, contacts, addresses, locations, people, businesses, emails, or other text descriptor. At step 311, the user can open a media such as a list of contacts. The user can then create an alpha-numeric finger sign for the letter 'm'. At step 312, the media device can narrow the list of media in response to identifying the letter 'm'. More specifically, the media device can present a list of media that corresponds to at least a portion of the search string. For example, the media device can present the names starting with the letter 'm'. The media device may present the list of media in alphabetical order.

Upon the media device 100 presenting the list of media, the user may revert to a control finger sign, such as a touchless scroll (see step 313). In such regard, the user can scroll through the list of media by issuing a clockwise or counter-clockwise finger sign, which may be faster than creating another alpha-numeric character. The media device can highlight the media selection as the user performs the touchless scroll. The user can stop the touchless scroll when the desired media selection is highlighted. A touchless repetitive up/down motion can also be motioned for scrolling. At step 314, the media device can select the media selection in response to recognizing a touchless select, such as an up/down finger sign, a pause, or a verbal command. Upon selecting the media selection, the media device can supply the media to the user, or perform a service in response to the selection. As an example, when the list of media is a list of contacts, the media device can call the searched contact. When the media selection is a song, the media device can play the song, or stream the song from a server to the media device. When the media selection is a media channel, the media device can supply the media for the channel. Notably, the operations performed after the media is selected may be a function of the media. Accordingly, one skilled in the art can appreciate the different processes the media device performs in response to a touchless search.

Figure 6:
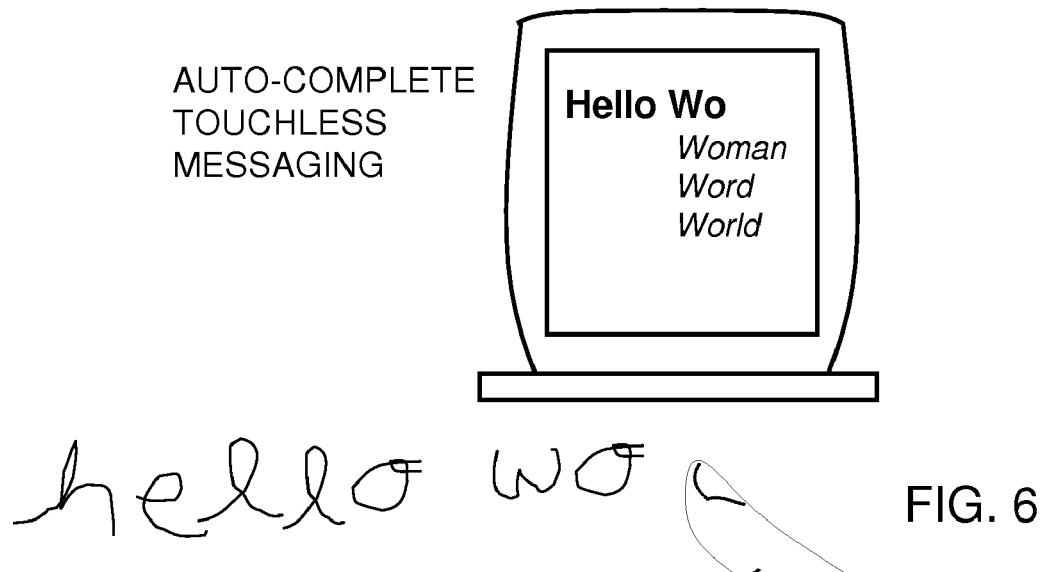
FIG. 6 is an exemplary user interface for auto-complete text messaging is in accordance with one embodiment.
Figure 7:
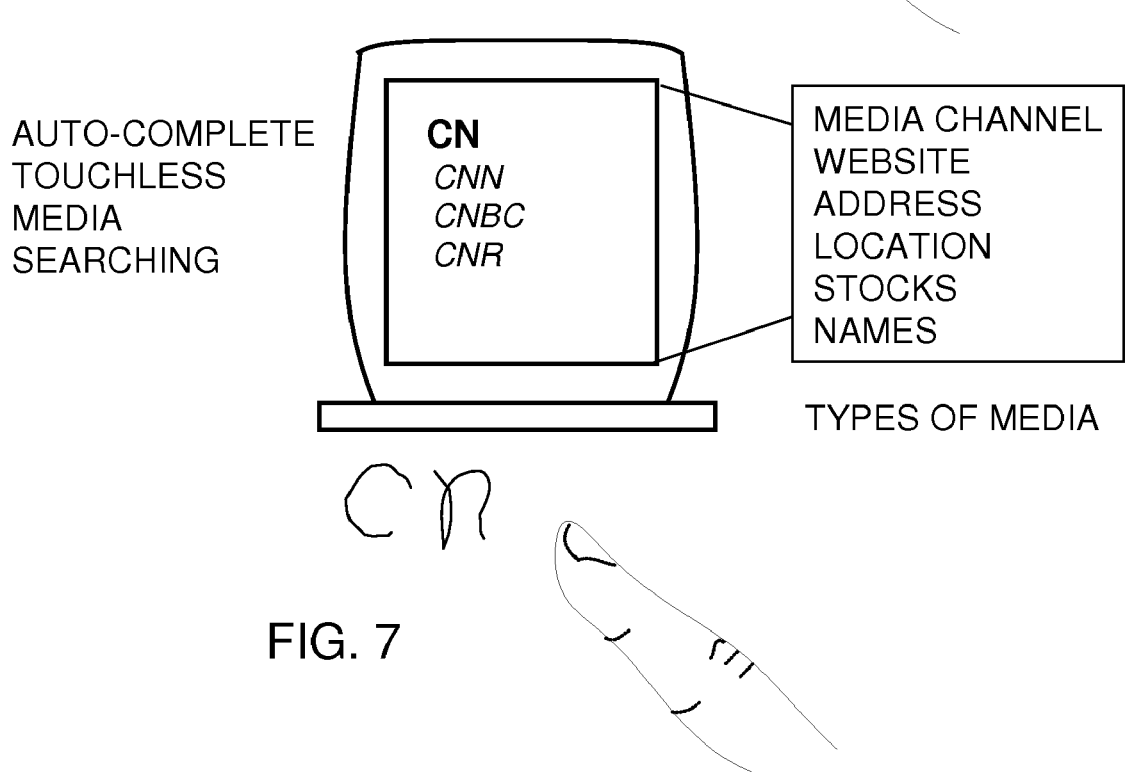
FIG. 7 is an exemplary pictorial for auto-complete media searching in accordance with one embodiment.

Referring to FIG. 6, the media device can also provide auto-completion to touchless messaging. For example, as a user generates a text message via touchless finger signing, a controller element of the media device can auto-complete the text message. More specifically, the controller element can receive at least one alpha-numeric character generated in a touchless sensory space as part of a touchless text message, and predict a word from the at least one alpha-numeric character. The word can then be used as a search string to search media. As an example, the controller element may interface a text completion program with the alpha-numeric characters provided by the sensing device 110. The text completion program may include a vocabulary of words that are organized by frequency of use. Moreover, a dictionary or word completion program can evaluate the occurrence of certain letters to auto-complete a word. In such regard, the media device can auto-complete a search string for conducting a media search without requiring the user to completely finish the search string.

Figure 8:
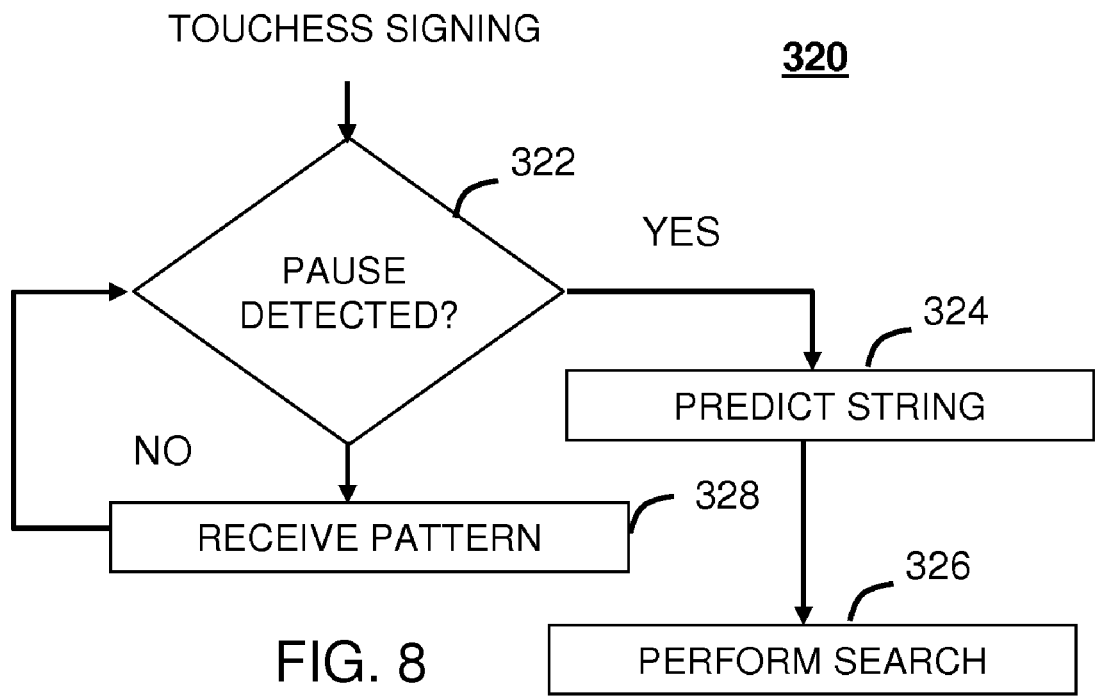
FIG. 8 is an exemplary control condition method for media searching in accordance with one embodiment.

Referring to FIG. 8, the media device can provide auto-completion for touchless media searching. For example, a user can request a media channel by spelling out the media channel, such as CNN. The media device, or a controller of the media device, can predict the media channel as each new alpha-numeric character is processed. The auto-complete touchless media searching can include media channel selection, website selection, address selection, location selection, stock selection, and name selection as example. For instance, a user can enter in an address one character at a time in the touchless sensing space 101, and the media device can present a list of media having a name or description that matches the letters. Moreover, the media device may auto-correct misspelled words, suggest corrections, or provide alternative spellings.

Figure 9:
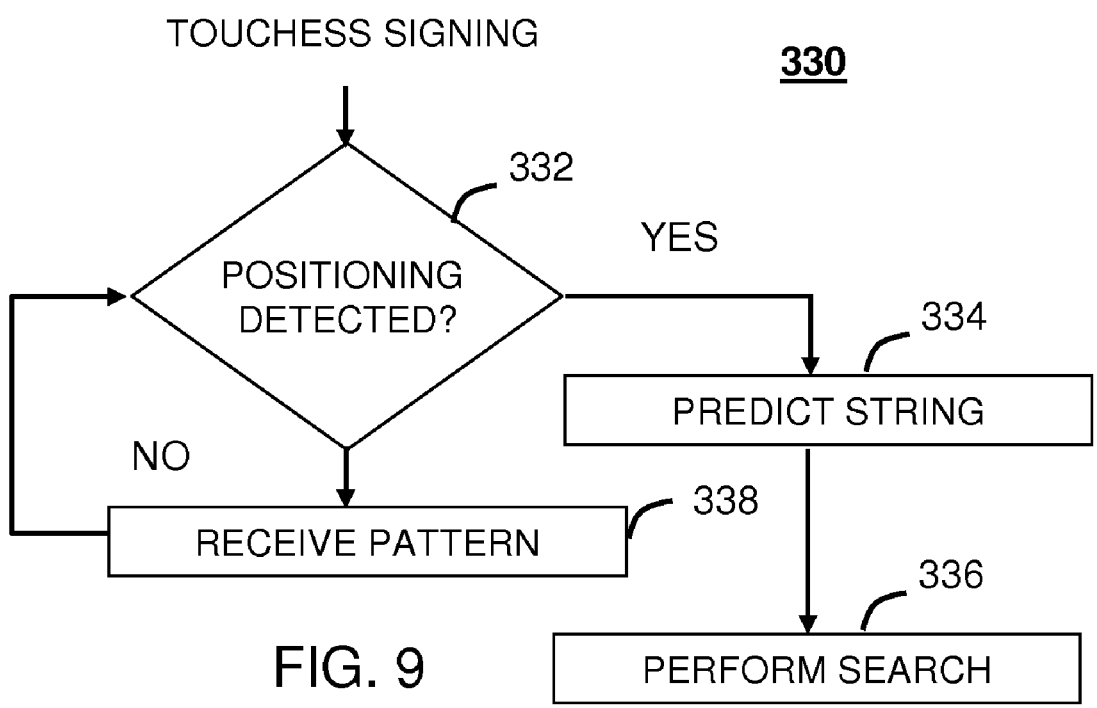
FIG. 9 is another exemplary control condition method for media searching in accordance with one embodiment.

Referring to FIG. 9, a flowchart 320 for performing a touchless search based on a finger pause is shown. The flowchart 320 identifies two exemplary control conditions for touchless searching; namely, when to predict a string, and when to conduct a search. Briefly, during a touchless signing, a user is moving the finger in the touchless sensory space 101 to create an alpha-numeric character. In accordance with one embodiment, the user can begin the finger sign with an initial pause. The pause is one exemplary control condition for initiating the prediction or performing the search. The pause control condition is merely one aspect of searching media, and is not limited to the order or arrangement of steps shown in FIG. 9. The user may also center the finger in the sensory space 101 to indicate a finger sign, or gesture, will soon commence. Both the pause and the centering can identify the start of the finger sign. Similarly, the user can perform a second pause the finger upon completing a touchless finger sign. The second pause can identify the end of the finger sign. Notably, the portion between the start and the stop finger movement identifies the alpha-numeric character. Also, when the user begins another character, the user generally moves the finger from the last location back to the center of the touchless sensory space 101. In such regard, the finger movement from the second pause back to the center location identifies a transitory movement. The transitory movement also helps identify when a finger sign is complete, or a new finger sign will commence.

At step 322, a controller element operatively coupled to the mobile device 100 can determine if a finger pause is detected. For example, the sensory device 110 can determine a finger pause condition when no motion is detected, and the finger is stationary. The controller element can continue to receive the pattern (e.g. touchless finger sign of an alpha-numeric character or control gesture) if no pause is detected as shown by step 328. When a pause is detected, the pattern can be considered complete, and the controller element can predict a string, such as a search string or a completion of a text message. Notably, the pause indicates that an alpha-numeric character is complete, and which can be sent to a text prediction engine. That is, the pause identifies the completion of the character to provide only the pattern of the finger sign that represents the alpha-numeric character. This can improve the prediction performance since the complete pattern is presented. Consider that the touchless sensing device 100 generates a point for each location of the finger. The points that describe the loci of points of the alpha-numeric character can be evaluated. The other points, such as the approach of the finger to the center position in the touchless sensory space, the transitory finger movement to create another character, or a retracting of the finger to terminate toucless searching are not generally used to define the alpha-numeric pattern.

The finger gesture can be identified by start and stop conditions which are identified by either a finger pause or a finger positioning. It should also be noted that pattern recognition can be performed in a streaming manner as points are received in order to predict the character completion. In such regard, the media device can provide auto completion of touchless finger signs. For example, as a user completes a touchless character, a visual list of characters can be presented from which the user can select. The use can accept an auto-completed finger sign instead of completing the alpha-numeric character. Upon predicting the string (e.g. letters of the search string versus completion of a character), the controller element can perform a media search using the search string. For example, as shown in FIG. 4, the media device 100 can present a list of media based on the search string provided or predicted search string. Referring back to FIG. 8, it should be noted that the search (step 346) can be performed after the character is recognized (step 342). Upon recognizing the character, a new list of search strings can be predicted and displayed to the user in the user interface from which the user can select. The prediction of the string is an optional step than can be included for conducting a touchless media search.

Referring to FIG. 9, a flowchart 330 for performing a touchless search based on a finger positioning is shown. Again, the finger positioning is an exemplary control condition for searching media. The control condition is merely one aspect of searching media, and is not limited to the order or arrangement of steps shown in 330. More specifically, a positioning of the finger can be used to determine when a search string is predicted or evaluated. For example, referring back to FIG. 1, the user generally presents one character at a time in the touchless sensing space 101. Upon completing a first character, a user re-centers the finger generally to a center area of the touchless sensing space 101. A controlling element in the sensing device (e.g. controller) determines when the finger has returned to a center location. The center location may also correspond to a preferred finger location (e.g. where the user prefers to start the finger sign) depending on the style of the media device. As one example, the control element can identify a stationary finger positioning within a base region of the touchless sensory space 101 (e.g. (x,y)~=0). Upon detecting a finger positioning at step 332, the media device can proceed to predict the string. Notably, the media device predicts the string when the user centers the finger for another character. This is in contrast to flowchart 320 which performs the prediction immediately after the finger sign is complete.

By waiting for the user to recenter, the media device presumes that the user has accepted the finger sign as a valid trace. Consider, that the user may make a mistake when creating the touchless sign. The method 330 allows the user to discard the finger sign, before making a decision as whether to predict a completion of the search string, or enter the character in the search string. For instance, the user may generate the letter 'c' when in fact the user intended to create the letter 'e'. The method 332 can ensure the prediction is performed after a re-centering of the finger in the touchless sensory space 101. Upon predicting the string at step 334, the media device can proceed to perform a search on the predicted search string. It should be noted that step 334 is an optional step. That is, upon detecting a re-centering of the finger at step 332, the media device can proceed to performing the search string without a prediction.

Figure 10:
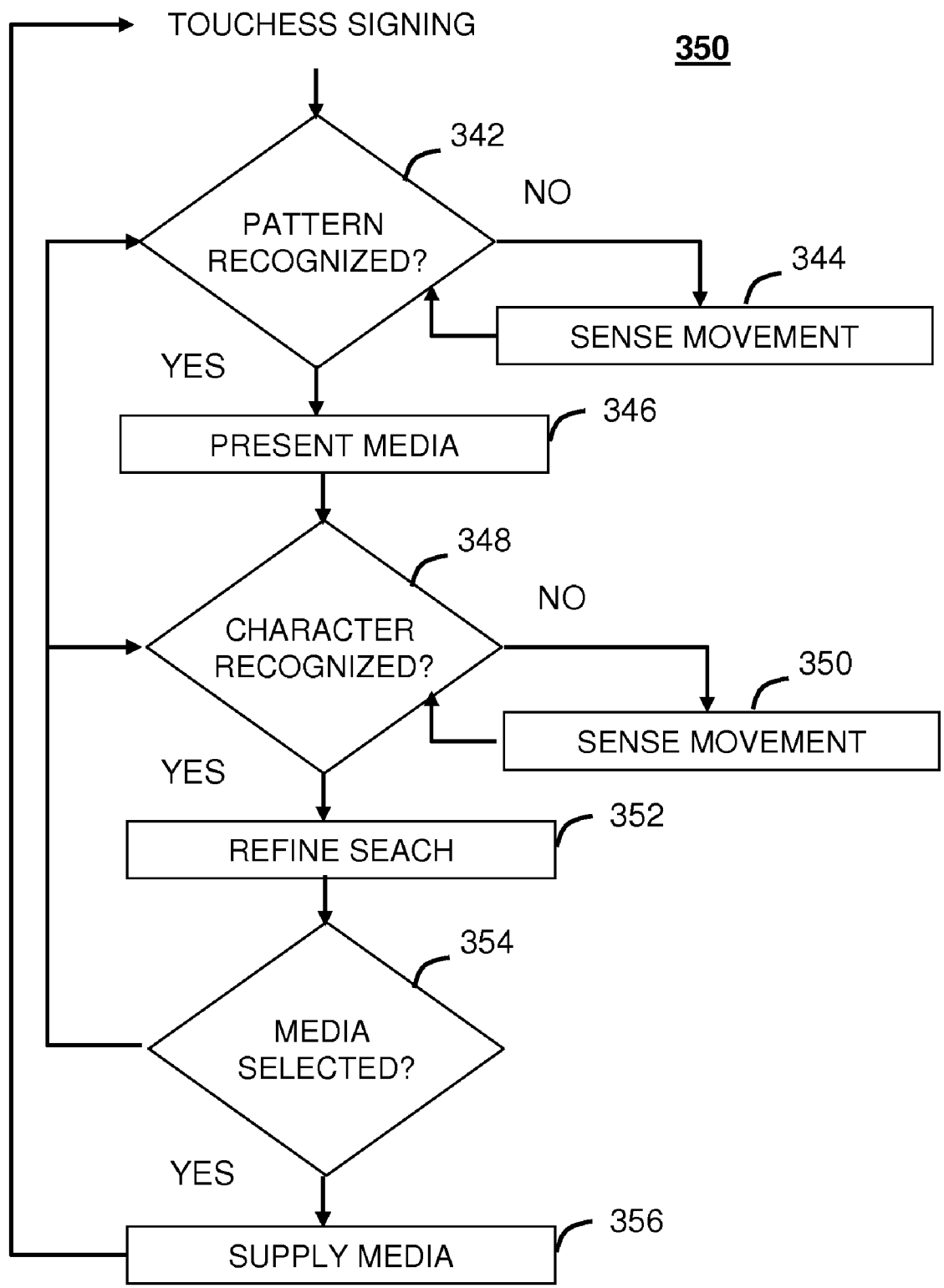
FIG. 10 is a method for media searching using a combination of touchless finger gestures and finger signs in accordance with one embodiment.
Figure 11:
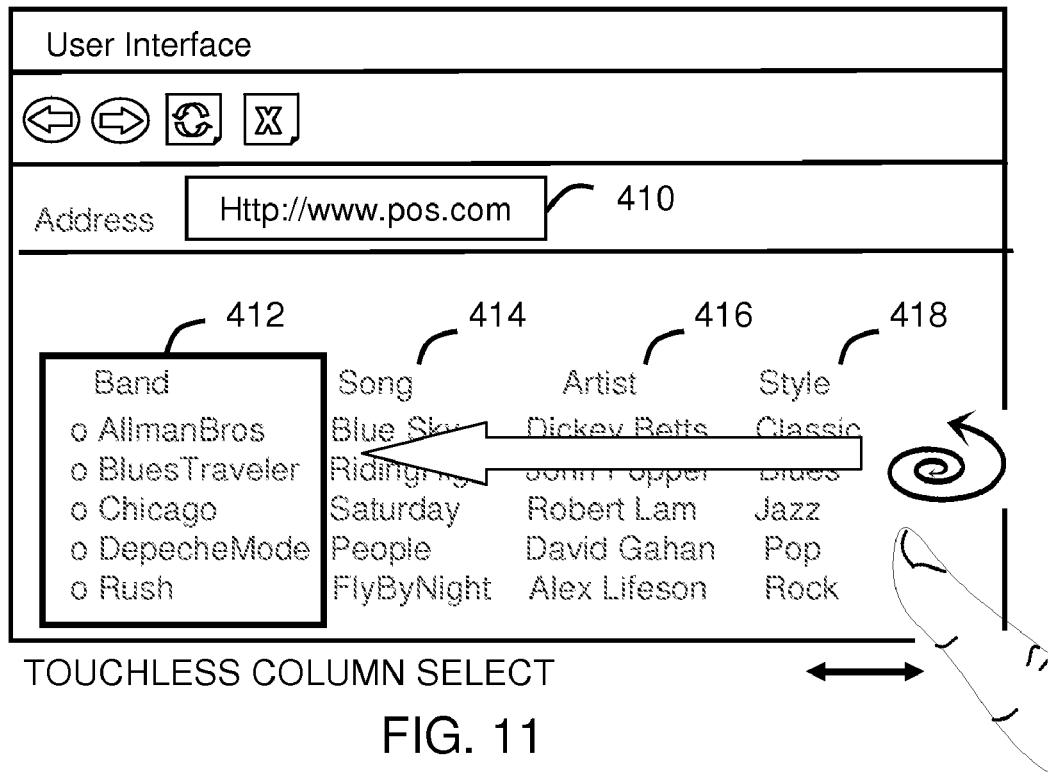
FIG. 11 is an exemplary user interface for searching media in accordance with one embodiment.

Referring to FIG. 10, a method 350 for performing a media search is shown. The method 350 can start in a state wherein a user generates a finger sign for creating a search string, or searching media in a user interface. As an example, method 350 may commence when a user opens a media console for music, email, voice mail, phone calls, location information, a business directory, navigation, or pictures. The media console may present a list of media selections corresponding to the media category. For example, referring to FIG. 11, a media console 400 for touchlessly selecting media (e.g. music) is shown. As an example, the user may touchlessly enter characters for a website 410 or a name of a media directory to download the music. Alternatively, the music may be stored locally on the media device 100. The media device 100 can present the media in categories of the music such as band 412, song 414, artist 416, and style 418 for touchless searching. Notably, a portable device such as a music player can contain thousands of songs, titles, artists arranged in various presentation formats other than those shown. As an example, the categories may be arranged in columns of the user interface as shown, though other arrangements, such as three-dimensional (3D) interactive clusters, or staggered panels, or a 3D rolodex are herein contemplated.

Figure 13:
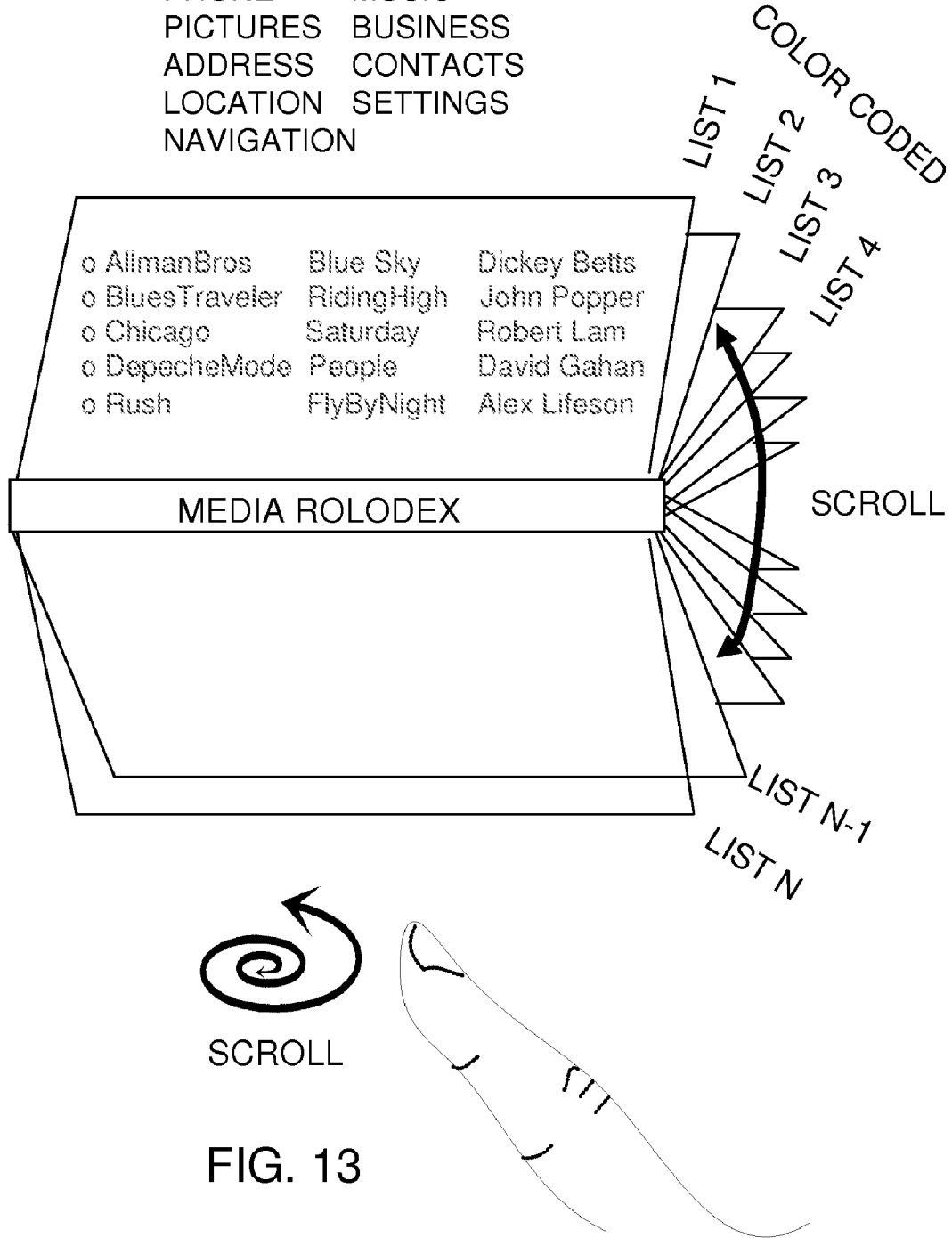
FIG. 13 is an exemplary media rolodex for media searching in accordance with one embodiment.

At step 342, the media device may recognize a pattern in a finger sign. A pattern, as example, may correspond to an up/down finger movement, a circular clockwise or counter-clockwise movement of the finger, or the pointing of a finger in a particular direction, or any other movement, as shown in FIG. 5 or 13. With respect to FIG. 11, the media device 100 can recognize a finger pattern such as a clockwise scroll to select a column. As the user rotates the finger clockwise the media device selects columns left to right. As the user rotates the finger counterclockwise the media device selects columns right to left. Alternatively, the user can point to a column to select the column.

Returning back to FIG. 10, upon recognizing the finger pattern at step 342, the media device 100 can proceed to present the media at step 346. For example, the media device 100 can highlight the media selections identified by the finger pattern. The user can then proceed to search media selections in the column through touchless finger gestures. Alternatively, if a pattern is not recognized, the media device 100 can continue to sense touchless finger movements in the touchless sensing space 101. For example, referring to FIG. 11, upon the user pointing to the band column 412, the media device can highlight the media selections which comprise band names for the particular example. The media device may visually change the presentation of the band names to acknowledge that the band column 412 has been selected. Returning back to FIG. 10, at step 348, the user can then create a finger sign for a search string such as the spelling of a band name. The media device can then search for the media selection in view of the character as discussed in method 200 of FIG. 3.

Figure 12:
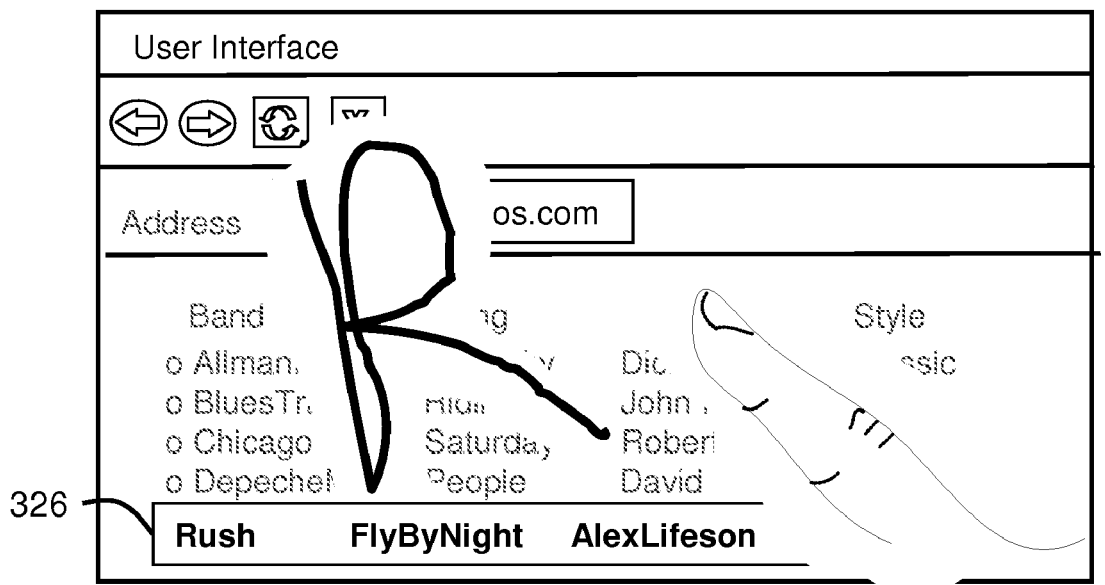
FIG. 12 is the exemplary user interface of FIG. 11 for searching media in accordance with one embodiment.

For example, referring to FIG. 12, the user upon selecting the band column 412 via a touchless finger scroll or pointing action, can create the letter 'r' in the touchless sensing space 101 to narrow the search of bands to those band names beginning with an 'r'. Referring back to FIG. 10, at step 352, the media device can refine the search based on the character 'r'. As an example, the media device 100 can alphabetize the list of band names, and present the list of media selections that start with the letter 'r'. For example, referring to FIG. 13, the band 'Rush' can be visually emphasized to denote that a search match has been found. Notably, other bands beginning with the letter 'r' can also be presented, and the user can continue to refine the search by entering in a character at a time.

Returning back to FIG. 10, the user can then issue a touchless finger gesture to select a media selection and continue the search. For instance, a band may have a number of albums and songs. Accordingly, the media device can then present a new media list for the selected band, where the media list may have a column of albums, or song titles. The method 350 can continue at step 342 to determine if the user is attempting to complete the search for an album name or song title. That is, the user may again perform a touchless scroll to scroll through a list of songs or albums. Again, at step 348, the user may generate a touchless character for a song title. The user can continue to perform a combination of touchless finger gestures (e.g. patterns) and finger signs (e.g. characters) for searching a media. It should also be noted, that the media device can perform auto-completion of search strings or prediction of search strings during the media search as previously discussed. Upon the user selecting a media selection, such as a song title, the media device at step 356 can proceed to supply the media. Notably, the media device 100 may supply the media from a local memory, such as a database of songs, or stream the media from a service provider. That is, a media device or service provider can supply media in response to touchless finger gestures and signs in accordance with the embodiments herein presented.

From the foregoing descriptions, it would be evident to an artisan with ordinary skill in the art that the aforementioned embodiments can be modified, reduced, or enhanced without departing from the scope and spirit of the claims described below. For example, referring to FIG. 13, a media rolodex 420 is shown. The media rolodex is one exemplary embodiment for presenting media in an efficient visual format for touchless searching. As an example, each panel of the rolodex can be a media category such as email, phone, voice, pictures, addresses, location, voicemail, business, music, contacts, and settings. The media categories can be color coded such that a user can see compressed categories in the rolodex based on color. Each category can also be linked to entries within other categories. For example, a contact within a contact list may provide a list of songs in the music category. The songs provided by the contact may be tagged with the contacts name, thereby allowing a user to search for songs based on the contact name. For example, a user in a media category can search for songs of a friend by spelling the contact's name in the music category. Similarly, a user may have a picture album with names of people in each picture. The user can spell the name of a person in a picture, and a search for all pictures with that person can be performed. In yet another arrangement, a user can perform a search for a person using a location search string. For example, a user may allow GPS to identify a location of a friend. The user can go to a location category (e.g. rolodex tab) and spell the name of a user to determine where the user currently is. The media device can present a location of the friend upon recognizing the search string. As yet another embodiment of searching media, a user can traverse through a large email directory using search strings created by a combination of finger signs and finger gestures.

Figures 14, 15:
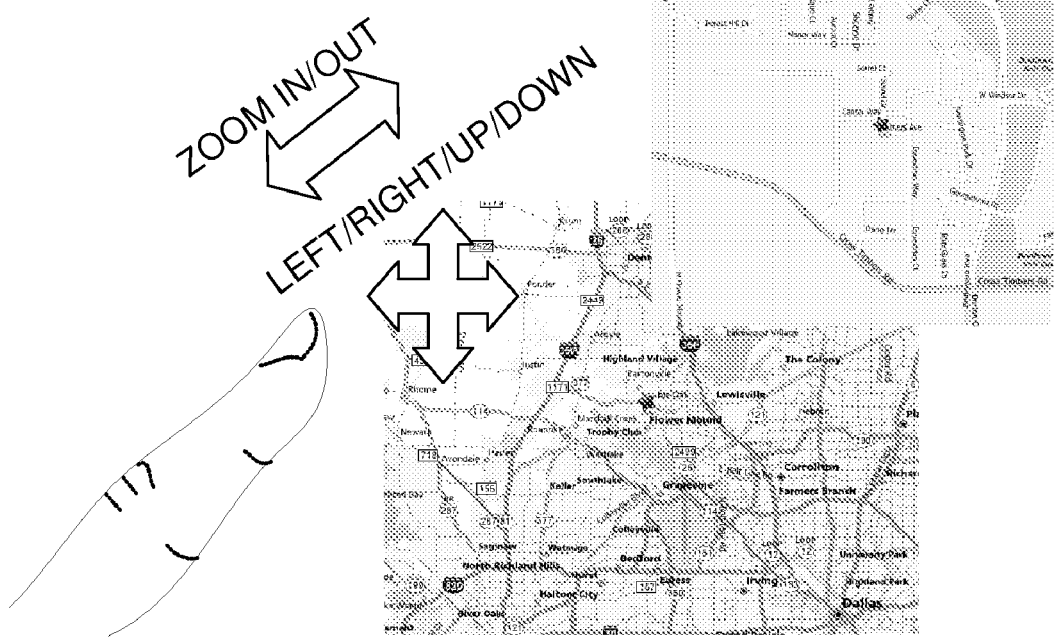
FIG. 14 is an exemplary navigation user interface in accordance with one embodiment.
FIG. 15 is an exemplary interactive map in accordance with one embodiment.
Figure 16:
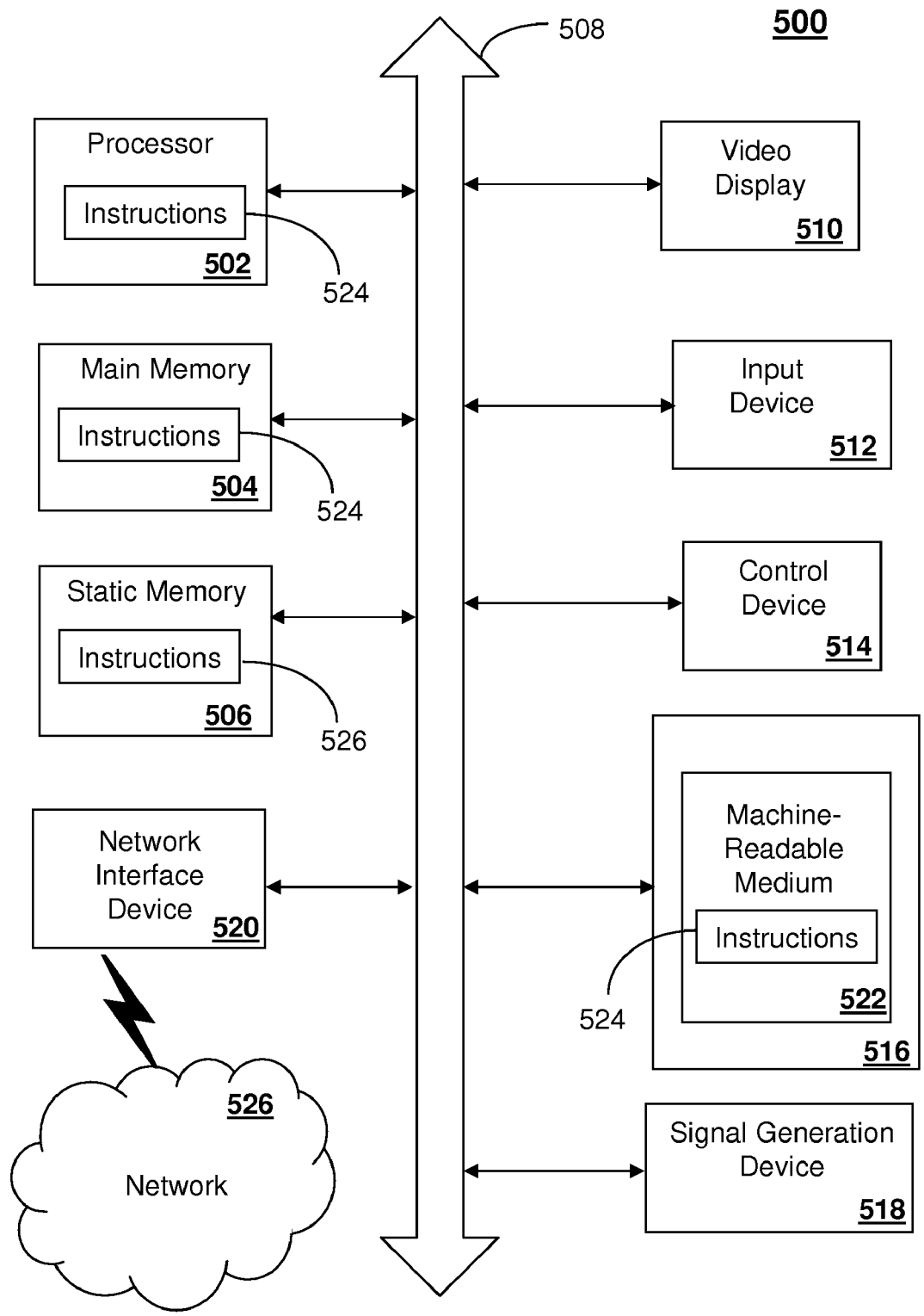
FIG. 16 depicts an exemplary diagrammatic representation of a machine in the form of a computer system within which a set of instructions, when executed, may cause the machine to perform any one or more of the methodologies disclosed herein.

In another embodiment, the method for media searching can apply to navigation using location based technologies such as Global Positioning System (GPS). Referring to FIG. 14, a user interface 430 providing touchless entry of address, location, or contact information using a search string is shown. The user interface can reside on a vehicle mounted navigation system, a laptop, a mobile device, a computer or any other communication device. The communication device can provide or receive GPS location used in a mapping program. The communication device including the mapping engine can be coupled to the sensing unit 110 internally or externally. The user interface 430 can receive an address entered by touchless characters from the sensing unit 110. The user interface may also receive a name, business name, city, state, zip code, or any other location based information. Upon receiving the characters, the communication device can present a map and directions to the address 432.

Referring to FIG. 15, an exemplary map 440 for the address 432 is shown. For example, upon receiving the search string for the address, the user interface can present the interactive map 440. The user can interact with the map using touchless finger gestures such as moving the screen right/left/up/or down to adjust the map position. The user can also project the finger forward or backward to zoom in or out of the map, or any other finger sign or movement to commence zooming. Other finger gestures, such as a circular counterclockwise movement can scroll out, and a circular clockwise movement can zoom in to the map. The finger signs and gestures can also be used in combination with a touchscreen of the communication device. For example, the user can create finger signs for the address without using a keypad, and then can depress zoom in or out buttons on the touchscreen for adjusting a view. Notably, the touchless finger signs do not introduce friction on the touchscreen, and allow a user to enter alphanumeric characters with less physical resistance. The communication device presenting the user interface can also provide visual and auditory feedback for acknowledging the recognition of finger signs and gestures.

FIG. 15 depicts an exemplary diagrammatic representation of a machine in the form of a computer system 500 within which a set of instructions, when executed, may cause the machine to perform any one or more of the methodologies discussed above. In some embodiments, the machine operates as a standalone device, such as a computer, laptop, mobile device, remote control, or display. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a mobile device, a cell phone, a control system, a network router, switch or bridge, or any machine capable of executing a set of instructions (sequential or otherwise) that specify actions to be taken by that machine.

It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display or LCD), a flat panel, a solid state display, or a cathode ray tube (CRT)). The computer system 500 may include an input device 512 (e.g., a keyboard, touchless sensing unit 110), a cursor control device 514 (e.g., a mouse, touchless sensing unit 110), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Aspects of touchless sensing are presented in the followings applications which are also incorporated herein by reference: Ser. No. 60/837,689 entitled "Method and System for Planar Sensory Detection", filed on Aug. 15, 2006, U.S. Patent Application No. 60/839,742 entitled "Method and System for a Touchless Interface", filed on Aug. 24, 2006, U.S. Patent Application No. 60/842,436 entitled "Method and Apparatus for Touchless Calibration", filed on Sep. 5, 2006, U.S. Patent Application No. 60/842,437 entitled "Method and Apparatus for Touchless Control of a Device", filed on Sep. 5, 2006, and U.S. Patent Application No. 60/855,621 entitled "Touchless User Interface for a Mobile Device", filed on Oct. 31, 2006, U.S. Patent Application No. 60/865,166 entitled "Method and Device for Touchless Signing and Recognition", filed on Nov. 9, 2006, and U.S. Patent Application No. 60/865,167 entitled "Method and Device to Control Touchless Recognition", filed on Nov. 9, 2006.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer readable storage medium, comprising computer instructions for directing a controller to perform the steps of:
   emitting ultrasonic waveforms from ultrasonic transducers to reflect off a finger in a three-dimensional touchless sensing space;
   digitally sampling the reflected ultrasonic waveforms off the finger to produce a sampled reflected ultrasonic waveform;
   tracking a relative location and movement of the finger in the three-dimensional ultrasonic sensing space from differential time of flight waveform analysis of the sampled reflected ultrasonic waveforms;
   suppressing a ringing portion of the emitted ultrasonic waveforms overlapping with the digitally sampled reflected ultrasonic waveform during tracking;
   minimizing distortion associated with ultrasonic transducer ring-down during generation of a high-resolution touchless finger signing with the suppressing;
   receiving a search string generated from the touchless finger signing of at least one alpha-numeric character or gesture; and
   presenting a list of media that corresponds to at least a portion of the search string,
   wherein the media is at least one among audio, image, video, and text.

2. The computer readable storage medium of claim 1, wherein the search string identifies at least one among an email selection, a voice mail selection, a phone call selection, a music selection, a picture selection, an address selection, a location selection, and a settings selection.

3. The computer readable storage medium of claim 1, wherein the search string identifies at least one among a name of an artist, a name of a band, a name of a song, a name of a station, and a genre of music.

4. The computer readable storage medium of claim 1, further comprising computer instructions for:
   alphabetizing the list of media to produce an alphabetic list;
   searching for the search string in the alphabetic list; and
   presenting a section of the alphabetic list that corresponds to the search string.

5. The computer readable storage medium of claim 1, further comprising predicting a completion of the search string including prediction of a cursive character completion.

6. The computer readable storage medium of claim 1, further comprising navigating a menu system via touchless finger gestures,
   where a zooming expands the menu approximately as a function of the finger distance to the display when the finger is between 2 cm and 12 cm above the display.

7. The computer readable storage medium of claim 1, further comprising performing a touchless scroll and touchless selection of a media selection in the list of media.

8. The computer readable storage medium of claim 1, wherein the list of media identifies at least one among a media channel, a voice mail, a contact, a business, a song, a picture, a map, an address, a location, a control, and a setting.

9. A portable media device comprising a controller element that
   emits ultrasonic waveforms from ultrasonic transducers to reflect off a finger in a three-dimensional touchless sensing space;
   digitally samples the reflected ultrasonic waveforms off the finger to produce a sampled reflected ultrasonic waveform;
   tracks a relative location and movement of the finger in the three-dimensional ultrasonic sensing space from differential time of flight waveform analysis of the sampled reflected ultrasonic waveforms;
   suppressing a ringing portion of the emitted ultrasonic waveforms that overlaps with the sampled reflected ultrasonic waveform during the tracking;
   minimizing a distortion associated with ultrasonic transducer ring-down during generation of a high-resolution touchless finger signing from the suppressing;

receives a search string from the touchless finger signing and presents at least one media that corresponds to at least a portion of the search string, wherein the search string includes at least one finger gesture generated in a touchless sensory field of the touchless sensing device.

10. The portable media device of claim 9, where the controller applies a weighting of a Time of Flight (TOF) ultrasonic distance measurement with a differential Time of Flight (dTOF) ultrasonic measurement corresponding to a location and relative displacement as the finger accelerates and decelerates between a far distance and a close distance for controlling a zooming, wherein the touchless sensory field is projected approximately 2 cm and above the media device for permitting three-dimensional interaction.

11. The portable media device of claim 10, wherein the controller element performs a controlled navigation and zooming of a map on a display in response to the touchless finger signing, where the zooming increases or decreases a size of the map according to a distance the finger is above the display.

12. The portable media device of claim 9, wherein the controller elements predicts a completion of the search string in response to a finger pause in the touchless sensory field approximately 2 cm or more above a display of the portable mobile device after completion of and a finger positioning in the touchless sensory field.

13. The portable media device of claim 12, wherein the controller element recognizes an alpha-numeric character from a touchless finger sign, and updates a prediction of the search string including prediction of cursive character completion based on the recognizing.

14. The portable media device of claim 9, wherein the controller elements alphabetizes a list of media to produce an alphabetic list, and presents a section of the alphabetic list corresponding to the search string.

15. The portable media device of claim 9, wherein the controller element performs touchless scrolling and touchless selection of the at least one media.

16. A media system on a mobile device, comprising a controller element that emits ultrasonic waveforms from ultrasonic transducers to reflect off a finger in a three-dimensional touchless sensing space;

digitally samples the reflected ultrasonic waveforms off the finger to produce a sampled reflected ultrasonic waveform;

tracks a relative location and movement of the finger in the three-dimensional ultrasonic sensing space from differential time of flight waveform analysis of the sampled reflected ultrasonic waveforms;

suppressing a ringing portion of the emitted ultrasonic waveforms overlapping with the sampled reflected ultrasonic waveform;

minimizing distortion with the tracking associated with ultrasonic transducer ring-down during generation of a high-resolution touchless finger signing;

receives a search string from the touchless finger signing and having at least one alpha-numeric character produced therefrom, and searches for a media that corresponds to at least a portion of the search string, wherein the media is at least one among audio, image, video, and text.

17. The media system of claim 16, wherein the controller element receives one more touchless finger sign, recognizes one more alpha-numeric character in the one more touchless finger sign, and updates a prediction of the search string based on the one more alpha-numeric character.

18. The media system of claim 16, wherein the controller element identifies a media selection that corresponds to the search string in response to the touchless finger signing.

19. The media system of claim 16, wherein the controller element receives touchless scrolling commands for scrolling through the alphabetized list, and receives touchless selection commands for selecting a media selection in the alphabetized list according to the touchless scrolling.

20. The media system of claim 16, wherein the controller element applies a combinational weighting of a Time of Flight (TOF) ultrasonic distance measurement corresponding to a coarse estimated location of the finger and a differential Time of Flight (dTOF) ultrasonic measurement corresponding to a relative displacement as the finger moves between a far distance and a close distance from the mobile device for supplying a media of an identified search string.

\* \* \* \* \*